(12) United States Patent
Liu et al.

(10) Patent No.: US 7,493,053 B2
(45) Date of Patent: Feb. 17, 2009

(54) MECHANISM TO SELECT BANDWIDTH IN AN OPTICAL RECEIVER CIRCUIT

(75) Inventors: Chien-Chang Liu, Sunnyvale, CA (US); Hengju Cheng, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 509 days.

(21) Appl. No.: 10/954,902

(22) Filed: Sep. 30, 2004

(65) Prior Publication Data

US 2006/0067710 A1 Mar. 30, 2006

(51) Int. Cl.
*H04B 10/12* (2006.01)

(52) U.S. Cl. ...................................... 398/209; 398/210

(58) Field of Classification Search .................. 398/208, 398/209, 210, 211, 213
See application file for complete search history.

(56) References Cited

U.S. PATENT DOCUMENTS

| 4,574,249 | A | 3/1986 | Williams |
| 4,608,542 | A | 8/1986 | Siegel |
| 5,917,968 | A | 6/1999 | Wood |
| 6,944,460 | B2 * | 9/2005 | Haartsen ................ 455/452.2 |
| 2002/0027689 | A1 * | 3/2002 | Bartur et al. ................ 359/152 |
| 2003/0002108 | A1 | 1/2003 | Ames et al. |
| 2003/0066947 | A1 | 4/2003 | Alwan et al. |
| 2004/0076360 | A1 | 4/2004 | Chen et al. |

FOREIGN PATENT DOCUMENTS

WO  WO 2004/051888 A1  6/2004

OTHER PUBLICATIONS

PCT/US2005/034147, International Search Report and Written Opinion, Jan. 13, 2006.

* cited by examiner

*Primary Examiner*—Christina Y Leung
(74) *Attorney, Agent, or Firm*—Blakely, Sokoloff, Taylor & Zafman LLP

(57) ABSTRACT

An optical receiver circuit is disclosed. This receiver included in receiver optical sub-assembly (ROSA) adjusts bandwidth based on a voltage level detection at a receiver signal strength indication (RSSI) pin, or rate-adaptively adjusts the bandwidth of optical receiver circuit based on operation data rate.

16 Claims, 5 Drawing Sheets

US 7,493,053 B2

MECHANISM TO SELECT BANDWIDTH IN AN OPTICAL RECEIVER CIRCUIT

FIELD OF THE INVENTION

The present invention relates to fiber optic communication; more particularly, the present invention relates to optical receivers.

BACKGROUND

More frequently, optical input/output (I/O) is being used in computer systems to transmit data between system components. Optical I/O is able to attain higher system bandwidth with lower electromagnetic interference than conventional I/O methods. In order to implement optical I/O, optical transceivers transmit and receive radiant energy to/from a waveguide, such as optical fibers.

However, in an optical transceiver circuit, the most encountered problem is the selection of preamplifier bandwidth. If the preamplifier (e.g., trans-impedance amplifier (TIA)) has too much bandwidth, the optical sensitivity and gain on the jitter performance will be degraded. Nevertheless, the optical sensitivity can be improved by reduce the bandwidth of TIA. Therefore, most designers pursue optimizing the bandwidth according to the different data rates. Typically, the TIA is designed to have a bandwidth of 0.7*bit rate.

Current ROSA (Receiver optical sub assembly) typically have five output pins (Vcc, GND, out+, out− and RSSI (receiver signal strength indication)). The RSSI pin is designed to generate the current output proportional to the received optical signal. Thus, there is no pin to select the bandwidth in the TIA inside the ROSA.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

According to one embodiment, a fiber optic communication mechanism is disclosed. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
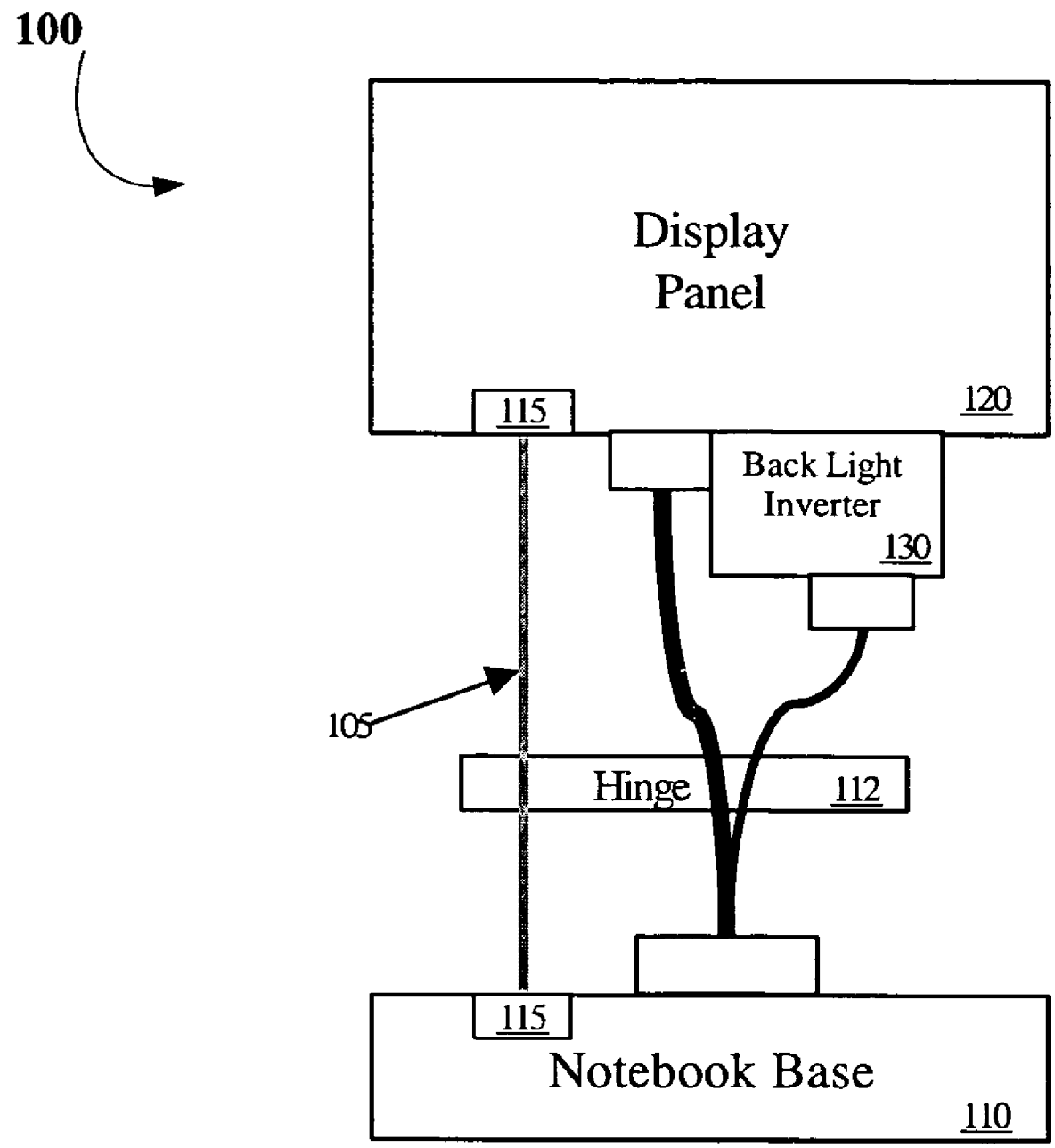
FIG. 1 illustrates one embodiment of a system.

FIG. 1 is a block diagram of one embodiment of a computer system 100. Computer system 100 is a notebook computer that includes a notebook base 110 attached to a display panel 120 via a hinge 112. System 100 also includes a back light inverter 130 coupled to panel 120 for lighting display 120.

According to one embodiment, base 110 and display panel 120 are also coupled via a waveguide 105. Waveguide 105 transmits radiant energy between base 110 and display panel 120 via receivers 115. Receivers 115 are implemented to receive data from waveguide 105. In one embodiment, waveguide 105 includes one or more optical fibers. However, other embodiments may feature other types of waveguides.

Figure 2:
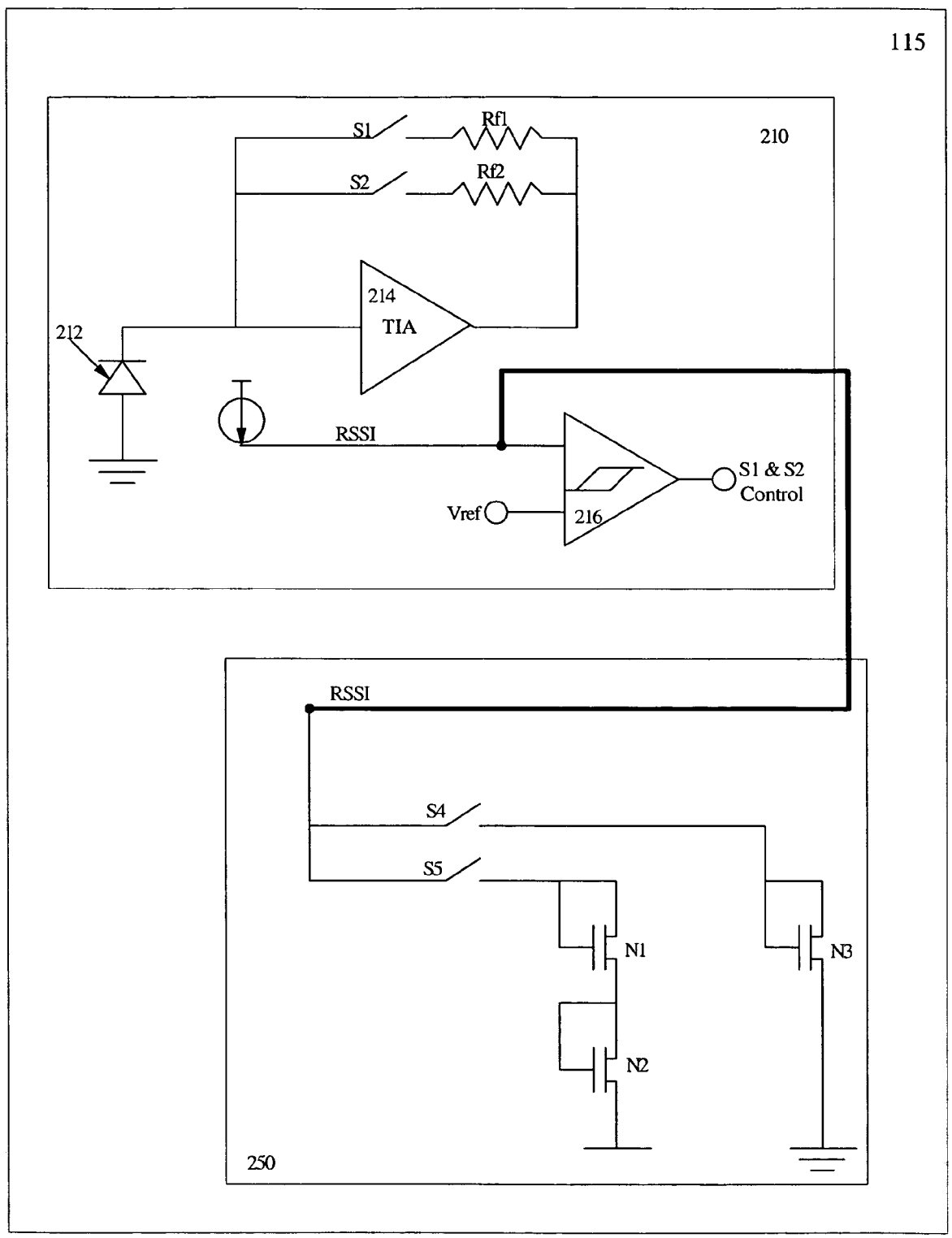
FIG. 2 illustrates one embodiment of a receiver circuit.

FIG. 2 illustrates one embodiment of a receiver 115. Receiver 115 includes a ROSA circuit 210 and a bandwidth adjustment circuit 250. ROSA circuit 210 includes active components that are implemented to receive an optical input. Particularly, circuit 210 includes a diode 212, a trans-impedance amplifier (TIA) 214, a comparator 216, switches S1 and S2, and feedback resistors Rf1 and Rf2 coupled to S1 and S2, respectively.

Diode 212 converts a received optical input signal into an electrical signal. In one embodiment, diode 212 is a positive, intrinsic, negative (PIN) diode. However, in other embodiments, diode 212 may be implemented with an Avalanche Photodiode (APD). TIA 214 receives the converted signal from diode 212 and amplifies the signal.

According to one embodiment, the bandwidth of TIA 214 may be adjusted to optimize the signal based on the system data rate. Accordingly, comparator 216 within circuit 210, and bandwidth adjustment circuit 250 are implemented to optimize the TIA 214 bandwidth. In one embodiment, comparator 216 receives a reference voltage (Vref) from bandwidth adjustment circuit 250 and compares the voltage to a voltage corresponding to a voltage received from the RSSI pin. As discussed above, the RSSI pin is designed to generate a current output proportional to the received optical signal.

In one embodiment, if the RSSI pin voltage is greater than Vref comparator 216 closes S1, and if the RSSI pin voltage is less than Vref, S2 is closed. Thus, TIA 214 will have one feedback resistance if the RSSI pin voltage is greater, and another resistance if the RSSI pin voltage is less than Vref.

Bandwidth adjustment circuit 250 indicates to ROSA circuit 210 which data rate is to be used. For example, bandwidth adjustment circuit 250 indicates whether the data rate is 2 Gb/sec or 4 Gb/sec. Circuit 250 includes NMOS transistors N1-N3. In one embodiment, each of the transistors has the same characteristics. Transistors N1 and N2 are coupled to a switch S5, while transistor N3 is coupled to a switch S4. Both switches are coupled to the RSSI pin to receive current.

According to one embodiment, switch S4 is closed if the system is to operate at a 2 Gb/sec. As a result, the voltage buildup at the RSSI pin will be approximately equivalent to the voltage threshold (Vt) plus the source-drain voltage (Vds) if S4 is closed. Similarly, switch S5 is closed if the system is to operate at a 4 Gb/sec. Thus, the voltage buildup at the RSSI pin will be approximately equivalent to the voltage threshold 2*(Vt+Vds) if S5 is closed.

In operation, the system user would close (turn on) either switch S4 or S5 prior to operation of receiver 115 since the system data rate is known. For instance, if S1 is turned on it is known that the incoming data rate is 2 Gb/s data. Therefore, the RSSI voltage will be Vt+Vds above ground. If the data stream is 4 Gb/s, S2 is turned on, while S1 is off. Thus, the RSSI voltage will be 2*(Vt+Vds). At ROSA circuit 210 comparator 216 controls S1 and S2 by telling whether the voltage is higher or lower than Vref. In one embodiment, Vref is equal to 2*Vt.

If the RSSI voltage is higher than 2 Vt, the bandwidth can be selected by adjusting the feedback resistor of TIA 214. The feedback resistor is selected in effect by closing S1 or S2, depending upon which has the optimized resistance. In one embodiment, Rf1 has a lower resistance. Thus, S1 is closed by comparator 216 for 4 Gb/s data stream.

If the RSSI voltage is lower than 2 Vt, 2 Gb/s data rate operation occurs. Accordingly, resistor Rf2 is selected by closing S2. By using this technique, no additional pin is required at receiver 115 for optimization of TIA bandwidth selection.

Although described with respect to 2 Gb/sec and 4 Gb/sec, one of ordinary skill will appreciate that other data rates may be implemented (e.g., 1 Gb/sec and 2 Gb/sec) in other embodiments. Also, in other embodiments, the NMOS transistors may be replaced with PMOS transistors.

Figure 3:
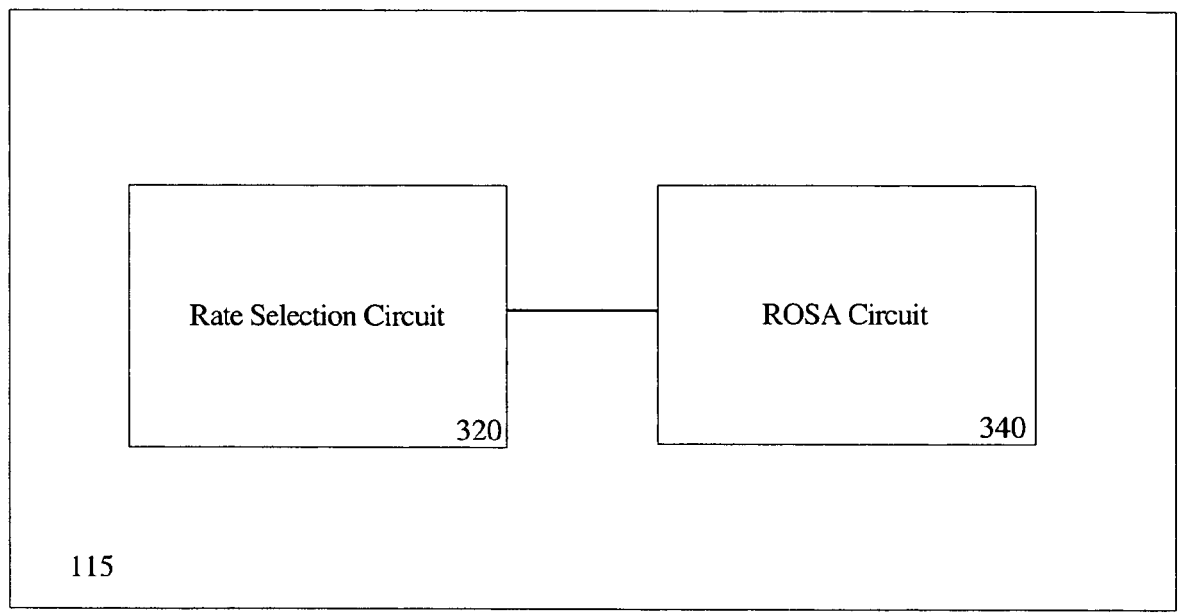
FIG. 3 illustrates another embodiment of a receiver circuit.
Figure 4:
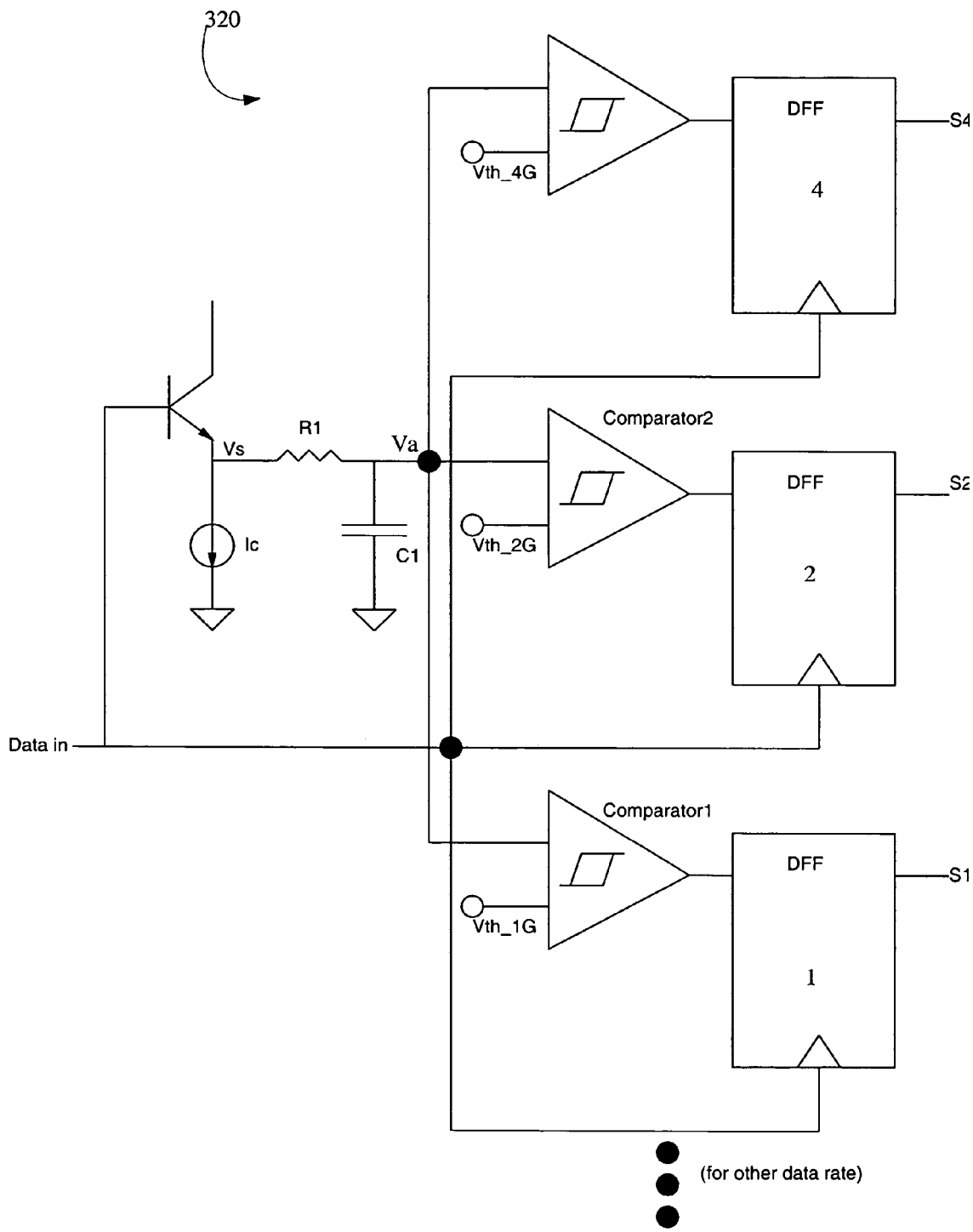
FIG. 4 illustrates one embodiment of a rate selection circuit.

According to a further embodiment, receiver 115 may implement automatic TIA data rate selection. FIG. 3 illustrates another embodiment of a receiver 115. In this embodiment, a rate selection circuit 320 is coupled to a ROSA circuit 340 to select the data rate at ROSA circuit 340. FIG. 4 illustrates one embodiment of rate selection circuit 320.

Selection circuit 320 includes three D flip flops (DFF1, DFF2 and DFF4) that receive data. Each DFF has a corresponding output. According to one embodiment, each DFF has an input coupled to the output of a comparator. For example, comparators 1, 2 and 4 are coupled to DFFs 1, 2 and 4, respectively. Further, each of the comparators is coupled to a node Va, which is coupled to a capacitor C1 and a transistor, via resistor R1.

Assuming the input data has a high pulse (logic 1), the nodal voltage Va will be charged to a fixed voltage Vhigh-$V_{BE}$. The charge is stored in capacitor C1. Subsequently, when the data input is switched to low (logic 0), the voltage on C1 starts to drop at a fixed rate by Qc1/Ic. Thus, the nodal voltage drops to different voltage levels based upon the data rate.

Figure 5:
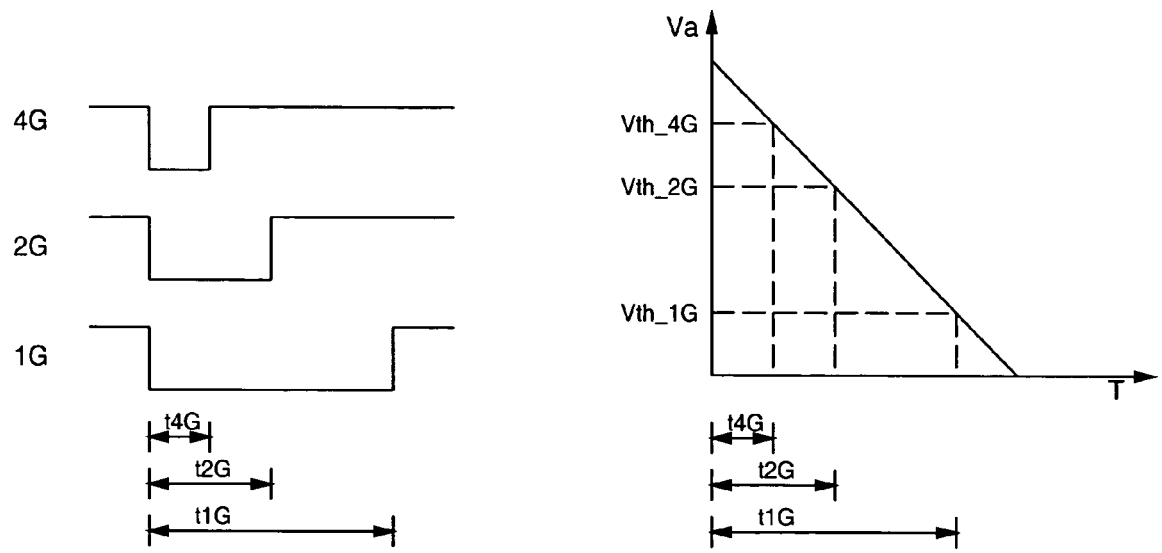
FIG. 5 illustrates one embodiment of waveforms for various data rates.

FIG. 5 illustrates one embodiment of waveforms for various data rates. As shown in FIG. 5, the shortest wave pulse for a 1 Gb/sec signal is twice as long as that for a 2 Gb/sec signal, and four times that of a 4 Gb/sec signal. Similarly, the wave pulse for a 2 Gb/sec signal is twice as long as that for a 4 Gb/sec signal. Therefore, the voltage drop for shortest wave pulse for a 4 Gb/sec signal is two times slower than for 2 Gb/sec and twice that of 1 Gb/sec.

Since the approximate time constants are known, the threshold voltage for each comparator may be set accordingly. For example, if the highest data rate is at 4 Gb/sec, the node voltage after the 0 pulse will drop above Vth__4G causing the D flip flop coupled to each comparator to have an output of logic 1. Thus the logic values of comparators 4, 2 and 1 are (1,1,1).

Similarly, if the data rate is at 2 Gb/sec, comparator 4 would be off and comparator 2, and comparator 1 would be on. Thus, the logic state of the three comparators would be (0,1,1). If the data rate is at 1 Gb/sec, the nodal voltage Va would only be higher than Vth__1G thus only comparator 1 would be high. Therefore, the logic state is (0,0,1). If the data rate is slower than 1 Gb/sec, all of these three comparators are off and the logic state is (0,0,0). Table 1 table below summarizes the above results.

TABLE 1

| Data rate | Comparator 4 | Comparator 2 | Comparator 1 |
|---|---|---|---|
| 4 Gb/s | 1 | 1 | 1 |
| 2 Gb/s | 0 | 1 | 1 |
| 1 Gb/s | 0 | 0 | 1 |
| <1 Gb/s | 0 | 0 | 0 |

Figure 6:
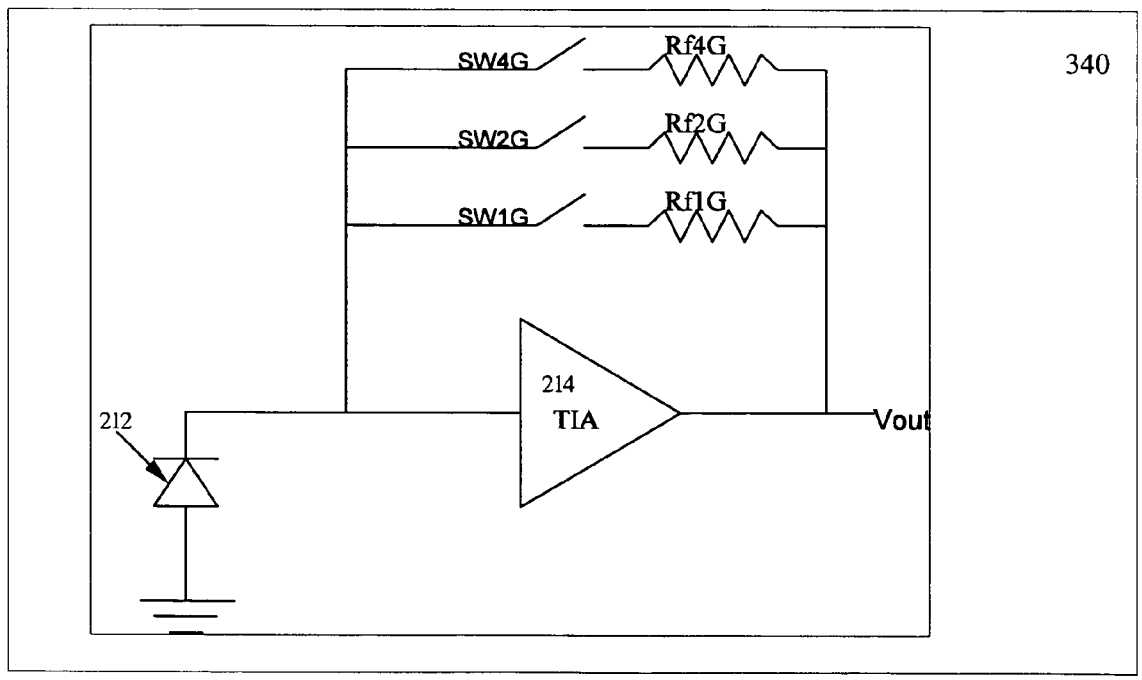
FIG. 6 illustrates one embodiment of a ROSA circuit.

FIG. 6 illustrates one embodiment of ROSA circuit 340. Circuit 340 includes diode 212 and TIA 214. In addition, feedback switches SW1G, SW2G and SW4G are included, each being coupled to respective feedback resistors Rf1G, Rf2G and Rf4G, respectively.

By using Table 1, logic is generated to control the selection of the feedback resistor at TIA 214. For instance, if the logic state is (111), switch SW4G is closed. If the logic state from the three comparators is (011), switch SW2G is turned on. Thus, the TIA bandwidth is selected for 2 Gb/s operation. Similarly, if all the logic state is (001), switch SW1G is closed to optimize the bandwidth of TIA 214 for a 1 Gb/s data stream. The beauty of this design is that it can automatically adjust the bandwidth without external pin selection.

Although described above with respect to a notebook computer implementation, receivers 115 may be used in various applications. For instance, system 100 may include printed circuit boards (PCBs). In one embodiment, receivers 115 may be used at one PCB to couple optical I/O from another PCB. The two PCBs may be included within the same computer system, or may be located at different systems and coupled via a network.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A receiver comprising:
   an optical receiver circuit to adjust bandwidth based on a voltage level at a receiver signal strength indication (RSSI) pin, including:
      a trans-impedance amplifier (TIA); and
      a comparator to adjust the bandwidth based on the voltage applied to the RSSI pin by selecting a first feedback resistance if the voltage applied to the RSSI pin is greater than a reference voltage, and selecting a second feedback resistance if the voltage applied to the RSSI pin is less than a reference voltage; and
   a bandwidth adjustment circuit to indicate an operation data rate by detecting the voltage level on the RSSI pin.

2. The receiver of claim 1 wherein the optical receiver circuit further comprises:
   a first resistor coupled o the output of the TIA:
   a first switch coupled to the first resistor and the input of the TIA;
   a second resistor coupled to the output of the TIA; and
   a second switch coupled to the second resistor and the input of the TIA.

3. The receiver of claim 2 wherein the comparator selects the first resistor by closing the first switch if the voltage applied to the RSSI pin is greater than a reference voltage, and selects the second resistor by closing the second switch if the voltage applied to the RSSI pin is less than a reference voltage.

4. The receiver of claim 2 wherein the bandwidth adjustment circuit comprises:
   a third switch coupled to the RSSI pin; and
   a fourth switch coupled to the RSSI pin.

5. The receiver of claim 4 wherein the bandwidth adjustment circuit further comprises:
   a first transistor coupled to the third switch;
   a second transistor coupled to the fourth switch; and
   a third transistor coupled between the fourth switch and ground.

6. The receiver of claim 5 wherein the first transistor applies a first voltage to the RSSI pin whenever the third switch is closed.

7. The receiver of claim 6 wherein the second transistor and the third transistor apply a second voltage to the RSSI pin whenever the fourth switch is closed.

8. The receiver of claim 1 further comprising a diode coupled to the TIA.

9. A method comprising:
   comparing a voltage applied to a receiver signal strength indication (RSSI) pin at an optical receiver circuit in a receiver optical sub-assembly (ROSA) to a reference voltage, by:
     selecting a first feedback resistor if the first voltage is applied to the RSSI pin; and
     selecting a second feedback resistor if the second voltage is applied to the RSSI pin; and
   adjusting the bandwidth based of the ROSA circuit based on the voltage.

10. The method of claim 9 further comprising:
    applying a first voltage to the RSSI pin if optical input/output (I/O) is being received at a first data rate; and
    applying a second voltage to the RSSI pin if I/O is being received at a second data rate.

11. A system comprising:
    a notebook computer base;
    a first receiver coupled to the notebook base;
    a waveguide coupled to the first receiver;
    a second receiver coupled to the waveguide; and
    a display panel coupled to the second receiver;
    wherein the first receiver and the second receiver each include:
      a receiver optical sub-assembly (ROSA) circuit to adjust bandwidth based on a voltage level at a receiver signal strength indication (RSSI) pin, including:
        a trans-impedance amplifier (TIA): and
        a comparator to adjust the bandwidth based on the voltage applied to the RSSI pin by selecting a first feedback resistance if the voltage applied to the RSSI pin is greater than a reference voltage, and selecting a second feedback resistance if the voltage applied to the RSSI pin is less than a reference voltage; and
      a bandwidth adjustment circuit to indicate an operation data rate by applying the voltage level to the RSSI pin.

12. The system of claim 11 wherein the ROSA circuit further comprises:
    a first resistor coupled to the output of the TIA;
    a first switch coupled to the first resistor and the input of the TIA;
    a second resistor coupled to the output of the TIA; and
    a second switch coupled to the second resistor and the input of the TIA.

13. The system of claim 12 wherein the bandwidth adjustment circuit comprises:
    a third switch coupled to the RSSI pin; and
    a fourth switch coupled to the RSSI pin.

14. The system of claim 13 wherein the bandwidth adjustment circuit further comprises:
    a first transistor coupled to the third switch;
    a second transistor coupled to the fourth switch; and
    a third transistor coupled between the fourth switch and ground.

15. The system of claim 14 wherein the first transistor applies a first voltage to the RSSI pin whenever the third switch is closed.

16. The system of claim 15 wherein the second transistor and the third transistor apply a second voltage to the RSSI pin whenever the fourth switch is closed.

\* \* \* \* \*